May 19, 1970  E. E. FOSTER ET AL  3,512,840
WHEEL COVER

Filed Nov. 24, 1967  6 Sheets-Sheet 1

INVENTORS
EDWIN E. FOSTER &
THOMAS E. FOSTER
BY
Barnes, Kisselle, Raisch & Choate
ATTORNEYS May 19, 1970     E. E. FOSTER ET AL     3,512,840

WHEEL COVER

Filed Nov. 24, 1967     6 Sheets-Sheet 2

INVENTORS
EDWIN E. FOSTER &
THOMAS E. FOSTER
BY
Barnes, Kisselle, Raisch & Choate
ATTORNEYS May 19, 1970  E. E. FOSTER ET AL  3,512,840
WHEEL COVER
Filed Nov. 24, 1967  6 Sheets-Sheet 3
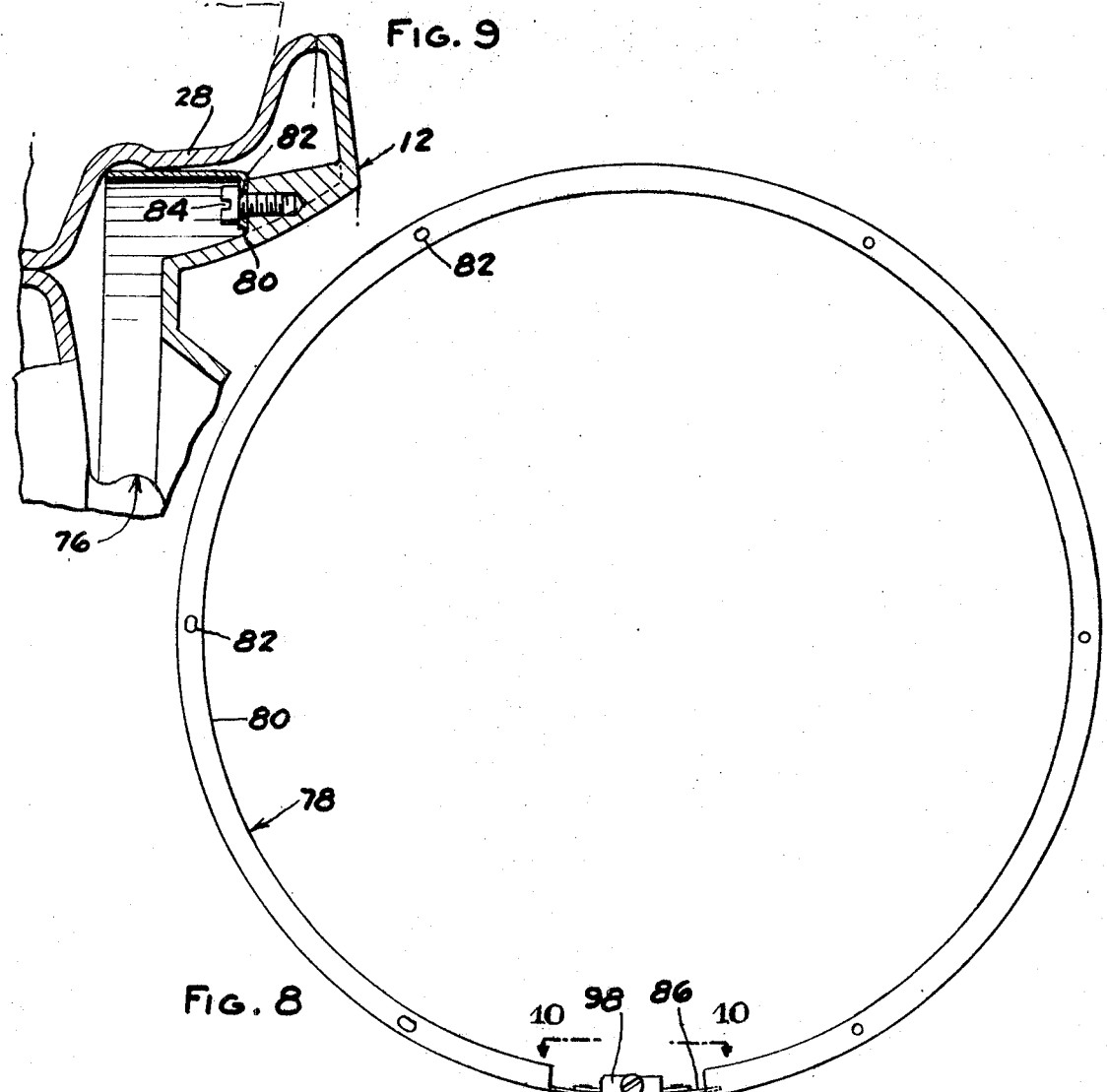
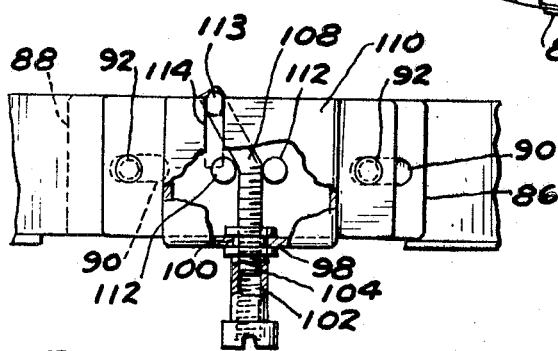
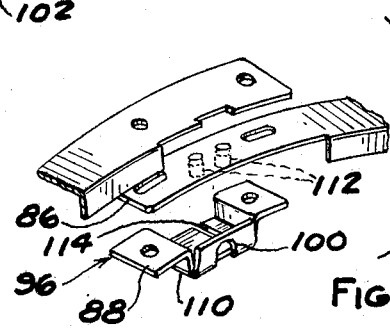
INVENTORS
EDWIN E. FOSTER &
THOMAS E. FOSTER
BY
Barnes, Kisselle, Raisch & Choate
ATTORNEYS

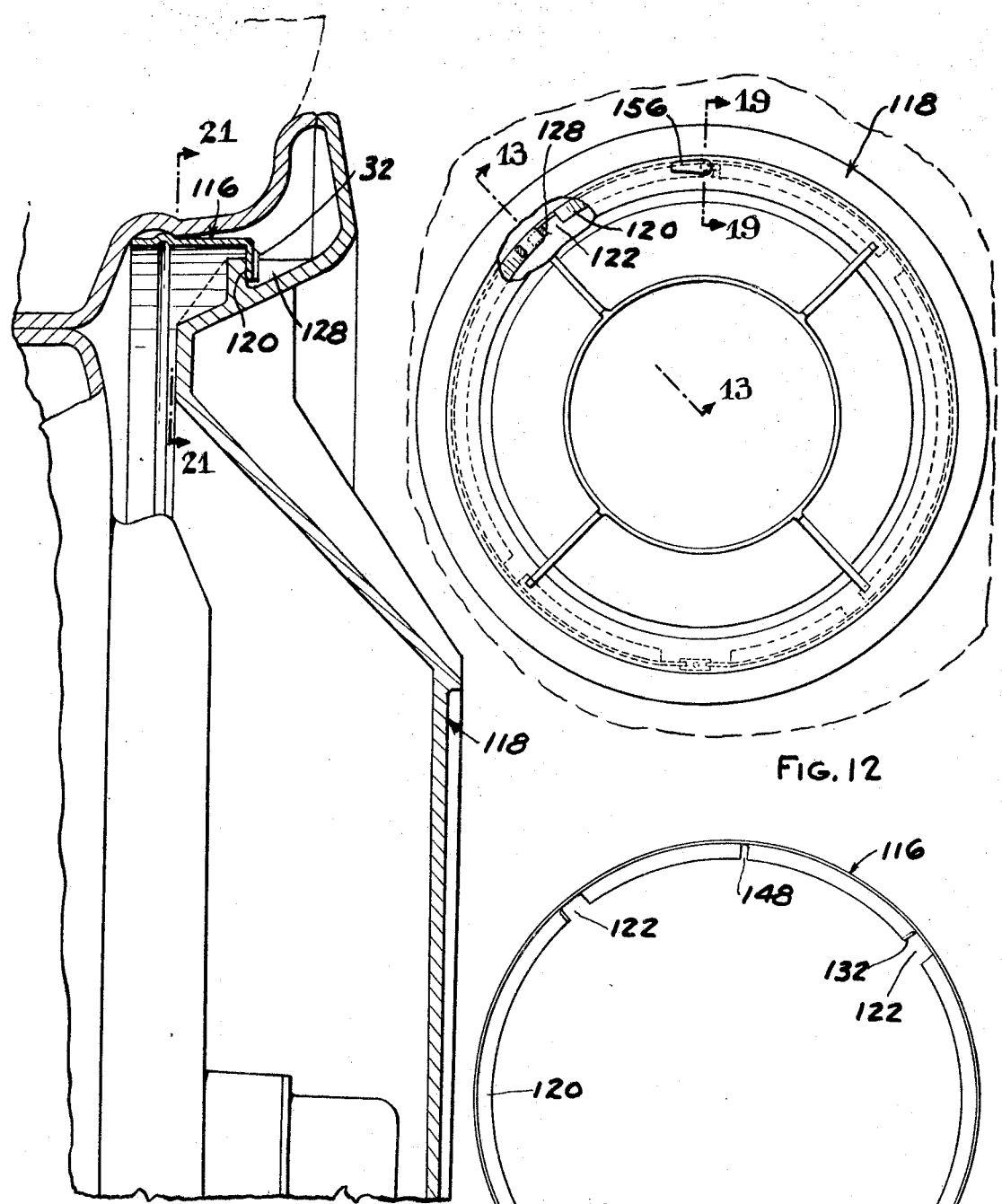

May 19, 1970    E. E. FOSTER ET AL    3,512,840
WHEEL COVER

Filed Nov. 24, 1967    6 Sheets-Sheet 5

INVENTORS
EDWIN E. FOSTER &
THOMAS E. FOSTER
BY
Barnes, Kisselle, Raisch & Choate
ATTORNEYS May 19, 1970   E. E. FOSTER ET AL   3,512,840
WHEEL COVER Filed Nov. 24, 1967   6 Sheets-Sheet 6

INVENTORS
EDWIN E. FOSTER &
THOMAS E. FOSTER
BY
Barnes, Kisselle, Raisch & Choate
ATTORNEYS

United States Patent Office 3,512,840
Patented May 19, 1970

3,512,840
WHEEL COVER
Edwin E. Foster, P.O. Box 714, Austin, Tex. 79167, and Thomas E. Foster, Austin, Tex.; said Thomas E. Foster assignor to said Edwin E. Foster
Filed Nov. 24, 1967, Ser. No. 685,382
Int. Cl. B60b 7/06
U.S. Cl. 301—37                              19 Claims

ABSTRACT OF THE DISCLOSURE

A cover for a vehicle wheel removably mounted on the wheel by a circumferentially expandable band adapted to frictionally engage the inner periphery of the wheel rim. The band is either permanently attached to the wheel cover or adapted to be removably connected to the wheel cover. Where the band is separate from the wheel cover it is first expanded into engagement with the wheel rim and the cover is thereafter attached to the wheel-mounted band. Where the band is permanently connected to the wheel cover the means for circumferentially expanding the band are accessible from the front side of the cover.

---

The invention generally relates to vehicle wheel covers and more particularly to a novel means for attaching a wheel cover to a vehicle wheel.

It is an object of this invention to provide a wheel cover having mounting means thereon which are easily operable, which are adapted to firmly retain the cover on the wheel after repeated applications and which are further designed for economical manufacture.

A further object of the invention resides in the provision of a wheel cover construction which enables the body of the wheel cover to be molded from plastic and the mounting means to be formed of metal.

Other objects and features of the invention will become apparent from the following description and drawings in which:

FIG. 8 is a plan view of a band of modified construction.

FIG. 9 is a fragmentary sectional view similar to FIG. 2 and showing the modified form of band of FIG. 8 on a wheel cover.

FIG. 10 is a fragmentary view of the wheel band as viewed in the direction of the arrows 10—10 in FIG. 8.

FIG. 11 is an exploded perspective view of the overlapping end portions of the band shown in FIG. 8.

FIG. 12 is a plan view, with parts broken away, showing a further modification of wheel cover according to the present invention.

FIG. 13 is a sectional view along the line 13—13 in FIG. 12.

FIG. 14 is a plan view of the band used on the wheel cover illustrated in FIG. 13.

FIG. 15 is a fragmentary perspective view of the band illustrated in FIG. 14.

Figure 1:
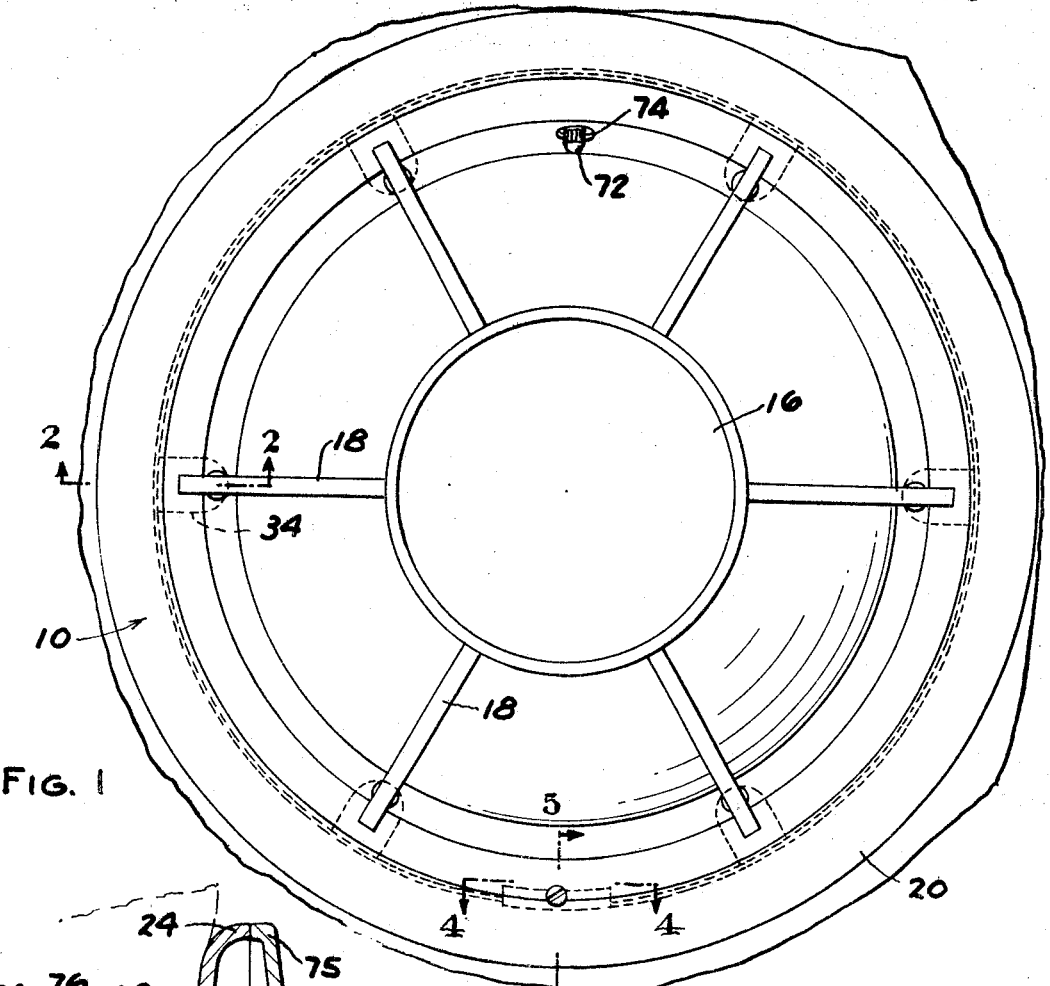
FIG. 1 is a plan view of a wheel cover embodying the present invention.

Referring first to the embodiment illustrated in FIGS. 1 through 7, the wheel cover, generally designated 10, includes a body portion 12 and a band 14 connected to the body 12 on the inner side thereof. Body 12 is preferably molded from plastic and includes a central hub portion 16 from which a plurality of ribs 18 radiate. Extending around the outer ends of ribs 18 is a peripheral flange 20. Body portion 12 is preferably molded as a single piece with the spaces between ribs 18 closed by a web 22. Cover body 12 is dimensioned so that the peripheral flange 20 overlies the outer edge 24 of wheel rim 26. The rim illustrated is of the drop center type and is fashioned with a generally axially extending annular portion 28 forming a seat for one of the tire beads. Rim 26, as is conventional, is attached to a wheel body 30.

The general configuration of the cover and wheel shown may be varied considerably within the scope of the present invention, the specific form shown and described being only by way of illustration. The invention herein disclosed and claimed is directed specifically to the means provided for attaching wheel cover 10 to the rim 26 of the wheel.

In the embodiment illustrated in FIGS. 1 through 7 band 14 is in the form of a steel ring 32 having a plurality of radially inwardly extending tabs 34 spaced circumferentially around the band. Ring 32 is fashioned with parted overlapping ends 36, 38. A cam mechanism 40 is provided between the overlapping ends 36, 38 for circumferentially expanding and contracting band 14.

Figure 2:
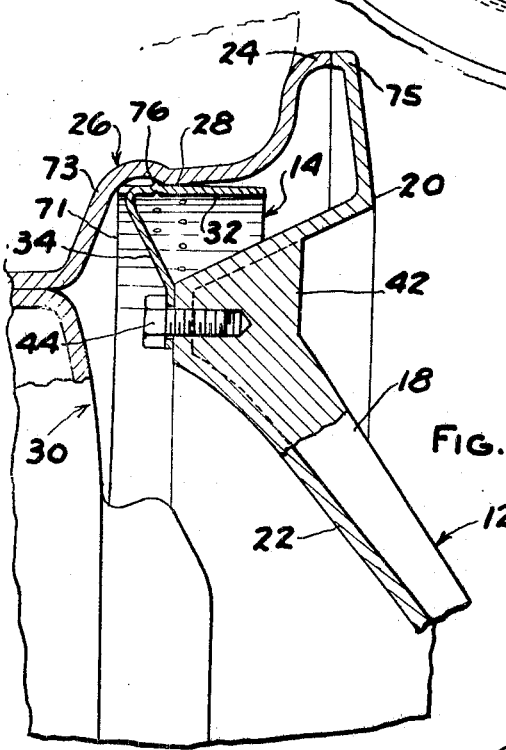
FIG. 2 is a sectional view along the line 2—2 in FIG. 1.
Figure 3:
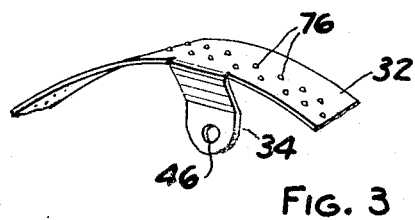
FIG. 3 is a fragmentary perspective view of the band utilized for securing the cover to a wheel.
Figure 4:
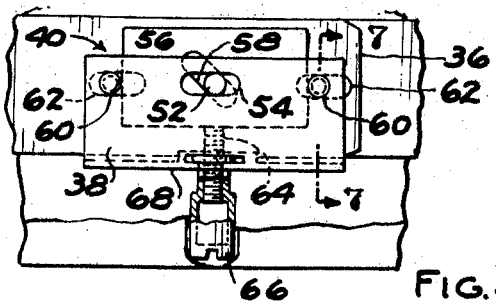
FIG. 4 is a fragmentary sectional view along the line 4—4 in FIG. 1.

As is shown in FIG. 2, band 14 is attached to generally solid lugs 42 molded on the inner side of body 12 at the outer ends of ribs 18. Band 14 is connected to body 12 by means of screws 44 extending through openings 46 in tabs 34 and threaded into lugs 42. If desired, threaded sleeves (not shown) may be molded in lugs 42 to receive the ends of screws 44. As indicated previously, band 14 is adapted to be circumferentially expanded and contracted. Accordingly, only two of the holes 46, designated 46a and 46b (FIG. 6), are of the same size as the shank of screws 44. The remaining holes, 46c, 46d, 46e and 46f, are progressively elongated to a greater etxent in a generally circumferential direction to enable a substantial portion of the band to shift circumferentially relative to the cover body 12 as the band 14 is circumferentially expanded and contracted.

Figure 5:
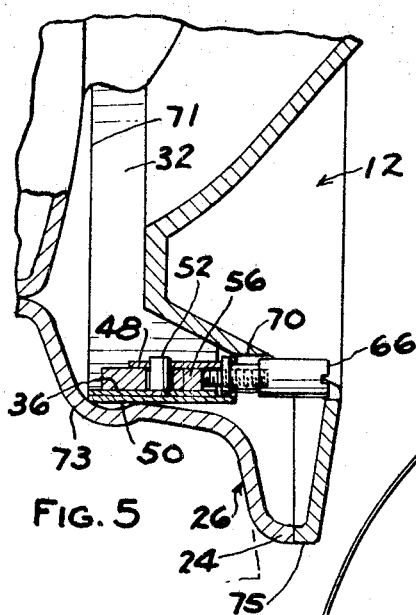
FIG. 5 is a fragmentary sectional view along the line 5—5 in FIG. 1.
Figure 6:
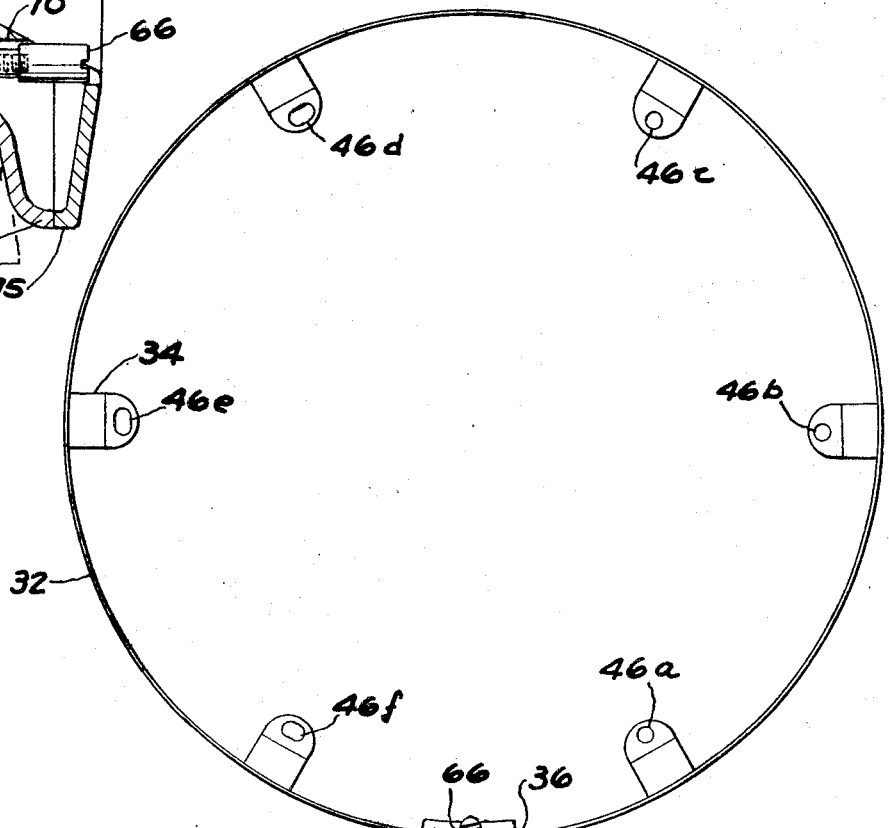
FIG. 6 is a plan view of the circumferentially expandable band.
Figure 7:
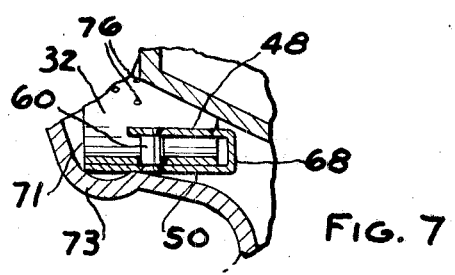
FIG. 7 is a fragmentary sectional view along the line 7—7 in FIG. 4.

As is indicated in FIGS. 5, 6 and 7, the end 38 of ring 32 is formed into an axially extending U having radially inner and outer walls 48 and 50, respectively. The end 36 of ring 32 overlies the inner side of wall 50 and has a radially inwardly extending rivet 52 thereon which projects through a circumferentially elongated slot 54 in the inner wall 48 of the U formed on the end 38 of the ring. Between wall 48 and end 36 there is arranged a cam block 56 having a generally diagonally-extending slot 58 therein through which rivet 52 projects. Movement of cam block 56 is restricted to a direction axially of the band by means of a pair of rivets 60 engaging the opposite side edges of block 56 and extending between the inner and outer walls 48, 50 of the U at the end 38 of ring 32. The end 36 of ring 32 is fashioned with circumferentially elongated slots 62 through which rivets 60 extend.

Cam block 56 is fashioned with a threaded stud portion 64 which is integrally connected therewith and which extends in a direction axially outwardly of the band. An internally threaded sleeve 66 is engaged with stud portion 64 and is mounted in an axially fixed position for rotation on the bight portion 68 which interconnects the inner and outer walls 48, 50 of the U at the end 38 of ring 32. The outer end of sleeve 66 projects through an opening 70 in the cover body 12 so that it is adapted to be rotated by means of a screw driver or the like from the outer side of the wheel cover.

The wheel cover illustrated in FIGS. 1 through 7 is applied to a wheel by pressing the cover against the outside of the wheel with the air stem 72 on the wheel projecting through a hole 74 provided in the cover body for accommodating the stem. The cover is pushed axially inwardly toward the wheel body as shown in FIGS. 2 and 5. In the preferred arrangement illustrated the axially inner edge 71 of band 14 engages the radial flange 73 on rim 26 to locate the wheel cover in an axial position on the wheel. While lip 75 around the outer periphery of flange 20 is shown abutting edge 24 of the rim, it may be spaced slightly therefrom to allow application of conventional wheel balancing weights to this edge of the rim.

After the cover is properly located on the wheel sleeve 66 is turned so as to draw cam block 56 in an axially outward direction. Since the rivet 52 on the end 36 of the band is engaged in the diagonally extending slot 58 in cam block 56, as the cam block 56 shifts in an axially outward direction, the end 36 of ring 32 is shifted circumferentially (in a direction to the left as viewed in FIG. 4) to expand the ring. Thus, the ring as a whole is expanded into engagement with the inner periphery of the generally axially extending seat portion 28 on rim 26. In this manner band 14 may be secured in tight frictional engagement with the wheel rim. If desired, a plurality of sharp protuberances 76 may be stamped or otherwise formed around the outside of ring 32 to enhance its frictional engagement with the inner periphery of the rim. The circumferentially elongated holes 46c through 46f accommodate for circumferential shifting of a major portion of band 14 relative to the wheel cover body 12 when the band is expanded.

With the above described arrangement it will be observed that the wheel cover can be easily and quickly applied to or removed from a wheel. In addition, since the plastic cover body 12 is connected to the metal band 14 only at the tabs 34, the plastic body portion 12 is free to flex to a large extent independently of the band 14 as necessitated by the relative thermal expansion between the plastic and tne metal and also in response to the flexing of the wheel rim without building up severe internal stresses in the plastic body portion of the cover.

In the embodiment illustrated in FIGS. 8 through 11 the expandable band 78 is formed with a continuous, radially inwardly extending peripheral flange 80 in which the holes 82 are formed for accommodating the screws 84. At least some of the holes 82 are progressively elongated as described above in connection with the holes 46 in the embodiment illustrated in FIGS. 1 through 7. Band 78 is mounted on the plastic body portion 12 of the wheel cover in substantially the same manner as described previously. Band 78 has overlapping ends 86, 88 which in the operative position are nested as shown in FIG. 10 with the end 88 lying against the inside of the end 86. The end 86 of the band is provided with a pair of circumferentially elongated holes 90 for accommodating rivets 92 by means of which the ears 94 of a retainer 96 are secured to the inner face of the end 88 of the band. The end 86 of the band is slidably arranged between ears 94 and the end 88 of the band. Retainer 96 has an axially outer wall 98 which is slotted as at 100 to receive and rotatably support a threaded sleeve 102. Sleeve 102 engages the threaded portion 104 of stud 106. The inner end of stud 106 is angularly inclined as at 108 and is trapped between the radially inner wall 110 of retainer 96 and the inner face of end 86 of the band. A pair of circumferentially spaced circular abutments 112 are riveted on the inner face of end 86 on circumferentially opposite sides of the angled stud portion 108 in engagement therewith. The free end of the angled stud portion 108 is provided with a radially inwardly extending detent 113 engaging an axially extending slot 114 in wall 110 of retainer 96 to prevent the stud 106 and sleeve 102 from cocking.

With the above-described arrangement of FIGS. 8–11 when threaded sleeve 102 is rotated in one direction stud 106 is drawn axially outwardly and the inclined portion 108 cams the circular abutments 112 in a direction to the left as viewed in FIG. 10 to circumferentially expand the band. When sleeve 102 is rotated to drive stud 106 in a direction axially inwardly the inclined portion 108 of the stud cams the circular abutments 112 in the opposite direction to contract the band. Movement of the inclined portion 108 of the stud is restricted to a direction axially of the band by the mounting of the sleeve 102 on retainer 96 and by the interengagement of detent 113 on the end of the stud with the axially extending slot 114 on the radially inner wall 110 of retainer 96.

A further embodiment of wheel cover according to the present invention is illustrated in FIGS. 12–22. In this arrangement the circumferentially expandable band 116 is entirely separate from the wheel cover body 118. As shown in FIGS. 14 and 15, band 116 is formed as a ring with a radially inwardly extending peripheral flange 120 around its axially outer edge. Flange 120 is provided with four circumferentially equally spaced notches 122. The inner side of the wheel cover, which is preferably formed of plastic, is molded with four ledges 124 circumferentially spaced to correspond with the spacing of notches 122. Ledges 124 are axially reinforced at one end by a gusset 126 and at the opposite end by an abutment portion 128. A second abutment portion 130 is spaced circumferentially from each gusset 126. One edge 132 of each notch 122 is flared outwardly slightly so that it serves as a cam edge for engaging behind (axially outwardly of) ledges 124 (FIG. 13).

Figure 16:
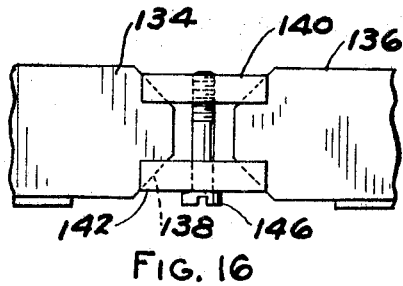
FIG. 16 is a fragmentary view of the band as viewed in the direction of the arrow 16 in FIG. 14.
Figure 20:
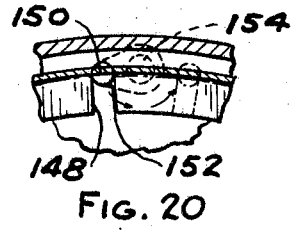
FIG. 20 is a fragmentary sectional view taken along the line 20—20 in FIG. 19.
Figure 19:
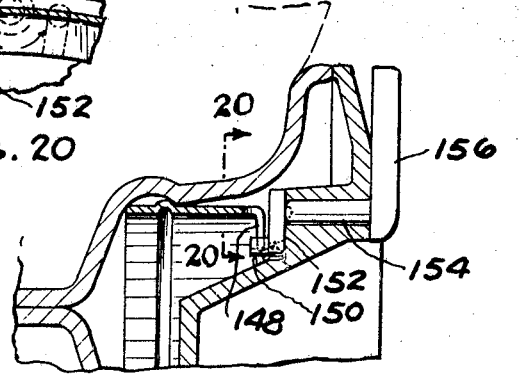
FIG. 19 is a fragmentary sectional view along the line 19—19 in FIG. 12.
Figure 17:
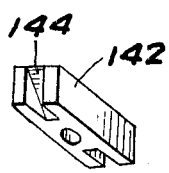
FIG. 17 is a perspective view of one of the camming elements illustrated in FIG. 16.
Figure 18:
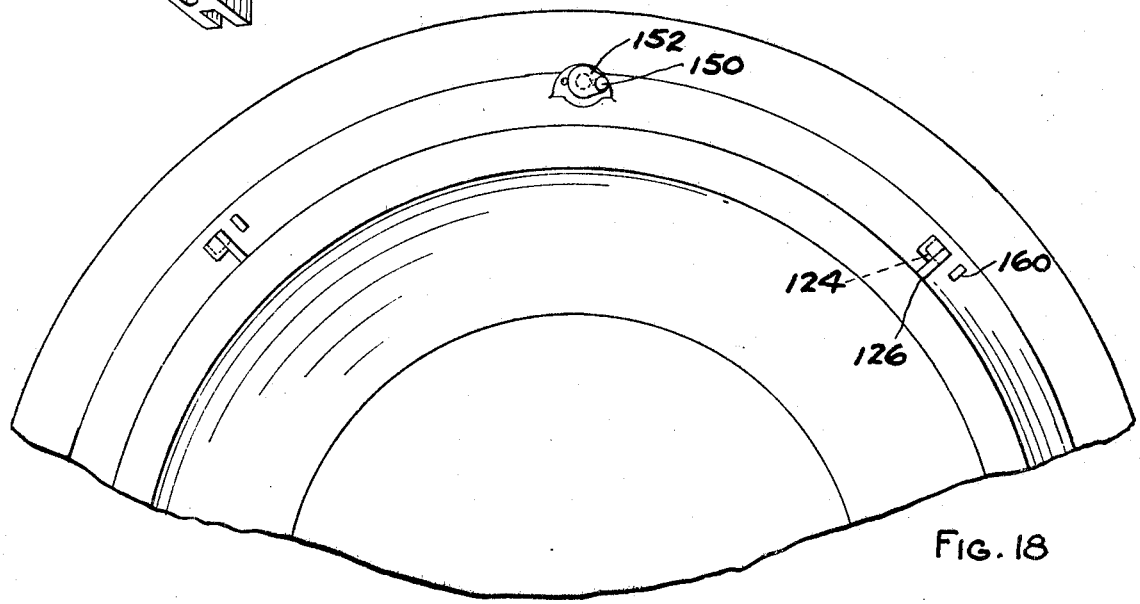
FIG. 18 is a fragmentary view of the cover shown in FIG. 12 as seen from the inside thereof.

Band 116 has parted ends 134, 136 the free end edges of which are angularly shaped as indicated at 138 in FIG. 16. Between the ends 134, 136 are arranged cam blocks 140, 142. Blocks 140, 142 are fashioned with angular slots 144 for receiving the angled edges 138 at the opposed ends of band 116. A screw 146 extends through block 142 and is threaded into block 140. With this arrangement it will be seen that when screw 146 is turned in a direction to draw blocks 140 and 142 toward one another the ends 134, 136 of the band are separated and the band is circumferentially expanded into tight engagement with the inner peripheral surface of the wheel rim.

Figure 21:
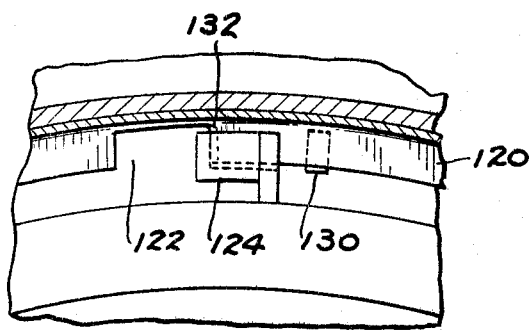
FIG. 21 is a sectional view along the line 21—21 in FIG. 13.
Figure 22:
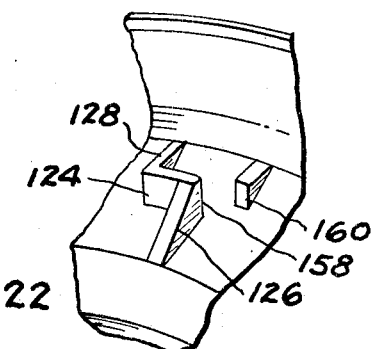
FIG. 22 is a fragmentary perspective view of the inside of the cover adjacent one of the attaching lugs.

As is shown in FIG. 14, the peripheral flange 120 is provided with a fifth radial slot 148. Slot 148 is adapted to be engaged by a rivet 150 on a rotary cam 152. Cam 152 is rotatably supported on the wheel cover by a shank 154 provided with a short handle 156 at the outer end thereof. In applying the wheel cover to the wheel after the band 116 has been expanded into firm engagement with the wheel rim, the cover is pressed against the wheel so that the leading edges 132 adjacent the notches 122 register with the edges 158 of ledges 124 (FIG. 22). When the cover is so located relative to band 116, rivet 150 is engaged in slot 148. Then when handle 156 is rotated, the cover is circumferentially shifted so that the leading edges 132 on flange 120 engage behind ledges 124 to securely connect the cover with band (FIGS. 21 and 22). Any suitable means may be employed for locking cam 152 to either of its two positions. When the cover is locked on the band as described, the axial face of flange 120 adjacent each of the leading edges 132 of flange 120 is engaged by the axially inner face 160 of supports 130 so that the cover is prevented from shifting axially, circumferentially and radially of the band 116.

Figure 23:
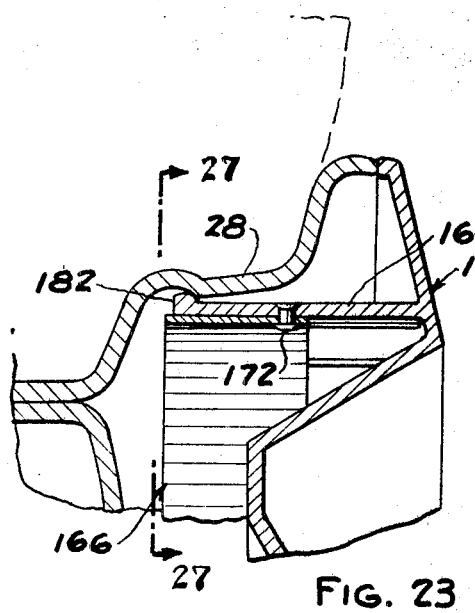
FIG. 23 is a fragmentary sectional view of a wheel cover showing a further embodiment of the cover mounting construction.
Figure 27:
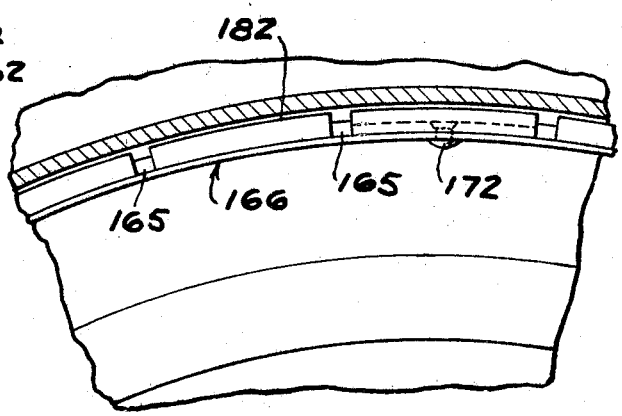
FIG. 27 is a fragmentary sectional view along the line 27—27 in FIG. 23.
Figure 24:
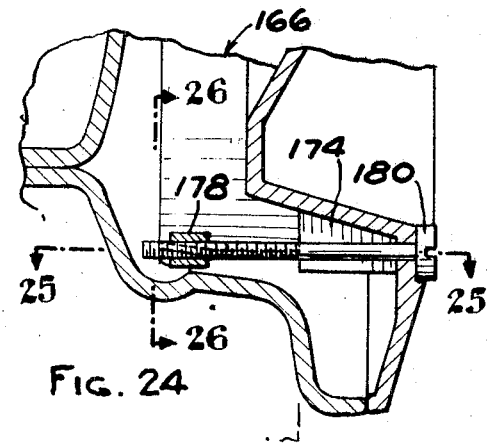
FIG. 24 is another sectional view of the wheel cover illustrated in FIG. 23 and showing the means for circumferentially expanding and contracting the cover mounting band.
Figure 26:
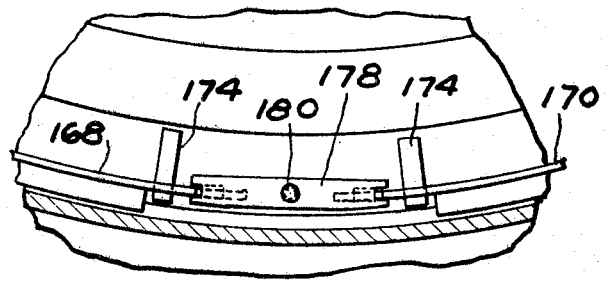
FIG. 26 is a fragmentary sectional view along the line 26—26 in FIG. 24.
Figure 25:
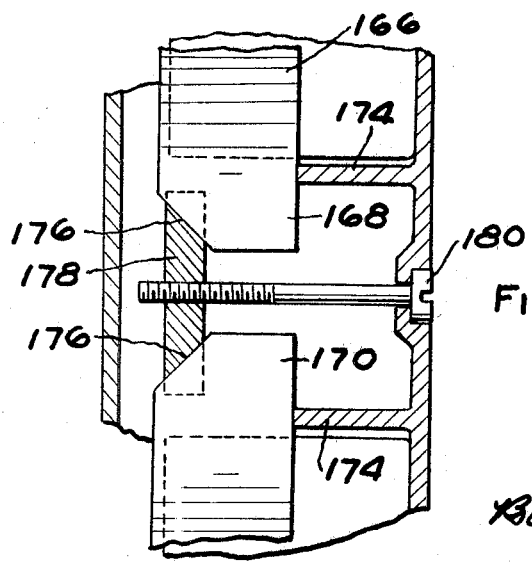
FIG. 25 is a fragmentary sectional view along the line 25—25 in FIG. 24.

In the arrangement illustrated in FIG. 23 the body portion 162 of the wheel cover is fashioned on its inner side with an axially extending flange 164 notched as at 165 to define a plurality of axially extending tabs 167. Tabs 167 generally define a circle the diameter of which is just slightly less than the circle defined by the inner peripheral surface of the tire bead seat 28. In this arrangement the expandable band 166 is formed as a ring having parted ends 168, 170. Band 166 is preferably connected with the annular flange 164 of cover body 162 by a single rivet 172. Rivet 172 is preferably located at the tab 167 diametrically opposite the parted ends 168, 170 of the band. Body portion 162 of the cover is also formed on the inner side thereof with radially extending ribs 174 against which band 166 is adapted to seat. The free ends 168, 170 of band 166 are fashioned with angled edges 176 with which a cam block 178 similar to cam block 140 (FIG. 16) is adapted to engage. A screw 180 extending through the body portion of the cover is engaged with cam block 178 and is arranged such that when the screw is rotated in one direction to draw block 178 in an axially outward direction the two ends 168, 170 of the band are separated and the band as a whole is circumferentially expanded. In this arrangement it will be observed that band 166 is disposed around the inside of flange 164. Thus, when the band is expanded, it serves to expand the notched flange 164 into firm frictional contact with the inner surface of the annular seat portion 28 of the rim. If desired, the inner edge of flange 164 can be molded with a slight enlargement 182 to assure a more positive retention of the cover on the wheel.

We claim:

1. A cover in combination with a vehicle wheel of the type having a radially inwardly facing annular surface on the rim thereof, said cover comprising a body member separate from said wheel and adapted to be positioned against and overlie said outer face thereof and said annular surface, a circumferentially expandable ring member mounted on the body member and disposed on the inner side thereof to register axially with said annular surface when the cover is positioned against the wheel, manually operable means connected with said ring member for expanding said ring member from a contracted condition wherein the ring is insertable within the opening defined by said annular surface to an expanded condition wherein the ring is in tight frictional engagement with said annular surface and the cover is thereby firmly mounted on the wheel, said means also being operable to contract the ring member from said expanded to said contracted condition to enable removal of the cover from the wheel, said cover having an opening therein by means of which said last-mentioned means are operable from the outer side of the cover, said ring including radially inwardly extending flange means and said cover body including relatively solid portions on the inner side thereof axially abutted by the inwardly extending flange means of the ring, a plurality of circumferentially spaced fastening means on said solid portions extending through said flange means for mounting the ring on the cover body, at least one of said fastening means being designed to provide a solid fixed connection between the cover body and the ring and the other fastening means providing a sliding connection between the ring and the cover body which permits the ring to shift circumferentially relative to the cover body when the ring is circumferentially expanded.

2. A wheel cover as called for in claim 1 wherein said fastening means include headed studs extending through holes in said flange means with the heads of the studs engaging the axially inner face of the flange means to prevent axial separation of the cover body and the ring, some of said holes being elongated in a direction generally circumferentially of the ring to permit the portions of the ring circumferentially adjacent the studs to shift circumferentially when the ring is expanded.

3. A cover in combination with a vehicle wheel of the type having a radially inwardly facing annular surface on the rim thereof, said cover comprising a body member separate from said wheel and adapted to be positioned against and overlie said outer face thereof and said annular surface, a circumferentially expandable ring member mounted on the body member and disposed on the inner side thereof to register axially with said annular surface when the cover is positioned against the wheel, manually operable means connected with said ring member for expanding said ring member from a contracted condition wherein the ring is insertable within the opening defined by said annular surface to an expanded condition wherein the ring is in tight frictional engagement with said annular surface and the cover is thereby firmly mounted on the wheel, said means also being operable to contract the ring member from said expanded to said contracted condition to enable removal of the cover from the wheel, said cover having an opening therein by means of which said last-mentioned means are operable from the outer side of the cover, said ring and cover body being fashioned with circumferentially spaced portions in axially abutting relation, said portions of the ring having holes therein, headed studs extending through said holes and into said portions of the cover body to prevent axial separation of the ring and cover body, at least one of said studs cooperating with its associated hole in the ring to solidly and fixedly connect the ring and cover body and the other holes and studs being relatively dimensioned to permit the portions of the ring adjacent the other studs to shift circumferentially relative to the other studs in response to expansion and contraction of the ring.

4. A wheel cover as called for in claim 3 wherein said portions of the ring comprise radially inwardly extending flange means.

5. A cover in combination with a vehicle wheel of the type having a radially inwardly facing annular surface on the rim thereof, said cover comprising a body member separate from said wheel and adapted to be positioned against and overlie said outer face thereof and said annular surface, a circumferentially expandable ring member mounted on the body member and disposed on the inner side thereof to register axially with said annular surface when the cover is positioned against the wheel, said ring member having a pair of parted ends, manually operable means connected with said ring member for expanding the ring member from a contracted condition wherein the ring is insertable within the opening defined by said annular surface to an expanded condition wherein the ring is in tight frictional engagement with said annular surface and the cover is thereby firmly mounted on the wheel, said means also being operable to contract the ring member from said expanded to said contracted condition to enable removal of the cover from the wheel, said cover having an opening therein by means of which said last-mentioned means are operable from the outer side of the cover, said manually operable means including a mechanism for shifting said parted ends of the ring member circumferentially relative to each other.

6. A cover in combination with a vehicle wheel of the type having a radially inwardly facing annular surface on the rim thereof, said cover comprising a body member separate from said wheel and adapted to be positioned against and overlie said outer face thereof and said annular surface, a circumferentially expandable ring member mounted on the body member and disposed on the inner side thereof to register axially with said annular surface when the cover is positioned against the wheel, said body member and ring member being permanently interconnected by means which permit slight circumferential expansion and contraction of the ring member relative to the body member, manually operable means connected with said ring member for expanding said ring member from a contracted condition wherein the ring is insertable within the opening defined by said annular surface to an expanded condition wherein the ring is in tight frictional engagement with said annular surface and the cover is thereby firmly mounted on the wheel, said means also being operable to contract the ring member from said expanded to said contracted condition to enable removal of the cover from the wheel, said cover having an opening therein by means of which said last-mentioned means are operable from the outer side of the cover.

7. A cover in combination with a vehicle wheel of the type having a radially inwardly facing annular surface on the rim thereof, said cover comprising a body member separate from said wheel and adapted to be positioned against and overlie said outer face thereof and said annular surface, a circumferentially expandable ring member mounted on the body member and disposed on the inner side thereof to register axially with said annular surface when the cover is positioned against the wheel, a plurality of circumferentially spaced support elements on said ring member and a plurality of fastening elements connecting said support elements with circumferentially spaced portions of said body member, at least some of said support elements and fastening elements being adapted to permit the support elements and the portions of the ring member connected thereto to shift circumferentially of the body member to accommodate for said circumferential expansion and contraction of the ring member, manually operable means connected with said ring member for expanding said ring member from a contracted condition wherein the ring is insertable within the opening defined by said annular surface to an expanded condition wherein the ring is in tight frictional engagement with said annular surface and the cover is thereby firmly mounted on the wheel, said means also being operable to contract the ring member from said expanded to said contracted condition to enable removal of the cover from the wheel, said cover having an opening therein by means of which said last-mentioned means are operable from the outer side of the cover.

8. A vehicle wheel cover as called for in claim 7 wherein at least one of said fastening elements is adapted to prevent its associated support element from shifting circumferentially of the body member.

9. A cover in combination with a vehicle wheel of the type having a radially inwardly facing annular surface on the rim thereof, said cover comprising a body member separate from said wheel and adapted to be positioned against and overlie said outer face thereof and said annular surface, a circumferentially expandable ring member mounted on the body member and disposed on the inner side thereof to register axially with said annular surface when the cover is positioned against the wheel, a plurality of circumferentially spaced support elements on said ring member and a plurality of fastening elements connecting said support elements with circumferentially spaced portions of said body member, said support elements comprising a plurality of radially extending tabs on said ring member, each of said tabs having an opening therein, said fastening elements comprising headed studs extending through the openings in said tabs with the heads of studs engaging the axially inner faces of the tabs to prevent axial separation of the ring and body members, at least some of said openings being larger than the cross section of the studs to permit some of said tabs and the portions of the ring member connected thereto to shift circumferentially relative to the cover body when the ring member is expanded and contracted, manually operable means connected with said ring member for expanding said ring member from a contracted condition wherein the ring is insertable within the opening defined by said annular surface to an expanded condition wherein the ring is in tight frictional engagement with said annular surface and the cover is thereby firmly mounted on the wheel, said means also being operable to contract the ring member from said expanded to said contracted condition to enable removal of the cover from the wheel, said cover having an opening therein by means of which said last-mentioned means are operable from the outer side of the cover.

10. A cover in combination with a vehicle wheel of the type having on the outer face thereof a generally axially extending annular surface which is concentric to the wheel axis, said cover having a body portion of sufficient radial extent to overlie said annular surface when the cover is placed concentrically against the outer face of the wheel, means defining a ring member secured generally concentric to the cover on the inner side thereof and adapted to register axially with said annular surface when the cover is positioned concentrically against the outer face of the wheel, said ring member having a pair of parted ends, manually operable means for shifting said ends of the ring member circumferentially relative to each other for expanding and contracting the ring, said manually operable means including means accessible from the outer side of the cover for actuating said manually operable means so that when said manually operable means are actuated in one direction said parted ends are circumferentially displaced to contract said ring member and when actuated in the opposite direction the parted ends are circumferentially displaced to expand the ring member whereby to enable the ring member to be frictionally engaged with and disengaged from said annular surface on the wheel.

11. The combination called for in claim 10 wherein said manually operable means includes a cam.

12. The combination called for in claim 10 wherein said annular surface comprises at least in part a radially inwardly opening circumferential groove on the rim of the wheel having a circumferential shoulder on the axially outer side thereof, said ring member having portions thereof adapted to engage within said groove behind said shoulder when the ring member is expanded.

13. The combination called for in claim 10 wherein said annular surface comprises a radially inwardly facing surface on the rim of the wheel and the ring member is adapted to be expanded into tight frictional engagement with said annular surface.

14. The combination called for in claim 13 wherein said body member includes axially inwardly extending flange means thereon extending around the outer periphery of said ring member and adapted to be clamped radially between said ring member and said annular surface on the wheel rim when the ring member is expanded.

15. The combination called for in claim 10 wherein said manually operable means includes a rotatable member on the inner side of said body member, said body member having an opening therein registering with said rotatable member for enabling rotation of the rotatable member from the outer side of the wheel cover.

16. The combination called for in claim 15 wherein said rotatable member includes an axially outwardly extending portion having a non-circular section adapted for engagement with a turning tool.

17. The combination called for in claim 10 wherein said ring member and cover are detachably interconnected and are separable in response to relative rotation of the cover body and ring member.

18. The combination called for in claim 17 wherein the means interconnecting the body and ring members comprise a plurality of circumferentially spaced sockets on one of said members which open in a circumferential direction and a plurality of circumferentially extending tongues on the other member and means for rotatably shifting the body member relative to the ring member to interlock the tongues and sockets when the body member is juxtaposed to the ring member with the tongues arranged to enter the sockets.

19. The combination called for in claim 18 wherein said last-mentioned means comprises a rotary cam on the cover member and a fixed member on the ring member adapted to be engaged by the rotary cam.

References Cited

UNITED STATES PATENTS

| | | | |
|---|---|---|---|
| 2,580,543 | 1/1952 | Henderson | 301—37 |
| 2,729,510 | 1/1956 | Lyon | 301—37 |
| 1,140,535 | 5/1915 | Schroeder | 220—61 |
| 1,268,550 | 6/1918 | Dunlap | 292—256.67 X |
| 1,362,340 | 12/1920 | Moore | 301—27 |
| 1,954,140 | 4/1934 | Lyon | 301—37 |
| 2,812,215 | 11/1957 | Waite. | |
| 2,902,316 | 9/1959 | Black. | |

RICHARD J. JOHNSON, Primary Examiner

U.S. Cl. X.R.

292—256.67